United States Patent
Geiger et al.

[19]
[11] Patent Number: 5,919,122
[45] Date of Patent: *Jul. 6, 1999

[54] METHOD OF MANUFACTURING FILTERS

[75] Inventors: Michael Geiger, Heibroun; Joachim Montnacher, Rehlingen; Josef Rohrmeier, Laberweinting; Thomas Zink, Stuttgart, all of Germany

[73] Assignees: Filterwerk Mann & Hummel GmbH, Ludwigsburg; Fraunhofer Gesellschaft zur Foerderung der Angewandten Forschung E.V., Munich, both of Germany

[*] Notice: This patent issued on a continued prosecution application filed under 37 CFR 1.53(d), and is subject to the twenty year patent term provisions of 35 U.S.C. 154(a)(2).

[21] Appl. No.: 08/948,038

[22] Filed: Oct. 9, 1997

Related U.S. Application Data

[63] Continuation of application No. 08/539,412, Oct. 5, 1995, abandoned.

[30] Foreign Application Priority Data

Oct. 5, 1994 [DE] Germany .............................. 44 35 532

[51] Int. Cl.[6] .............................. B31B 1/14; B31B 49/00
[52] U.S. Cl. .......................... 493/359; 493/402; 493/403; 493/417; 493/422; 493/424; 493/941; 219/121.7
[58] Field of Search .................................... 493/346, 347, 493/359, 381, 382, 401, 402, 403, 405, 410, 416, 417, 422, 423, 424, 441, 463, 941; 219/121.7, 121.71; 156/474, 475, 483–489

[56] References Cited

U.S. PATENT DOCUMENTS 3,106,528  10/1963  Burks .
3,321,345  5/1967  Duncan .................................... 156/474
3,392,843  7/1968  Mumby .
3,617,702  11/1971  Flournoy ............................. 219/121.71
4,218,606  8/1980  Whitman, III ....................... 219/121.7
4,227,955  10/1980  Woods et al. ........................... 156/489
4,265,254  5/1981  Koch et al. ........................... 219/121.7
4,297,559  10/1981  Whitman, III ....................... 219/121.7
4,349,719  9/1982  Cashwell et al. .................... 219/121.7
4,404,454  9/1983  Taylor et al. ........................ 219/121.7

(List continued on next page.)

FOREIGN PATENT DOCUMENTS

| 260267 | 3/1990 | European Pat. Off. . |
| 1949823 | 6/1970 | Germany . |
| 1761340 | 11/1970 | Germany . |
| 2137089 | 8/1973 | Germany . |
| 2807546 | 8/1979 | Germany . |
| 3113951 | 2/1983 | Germany . |
| 3622955 | 1/1988 | Germany . |
| U 8908176 | 9/1989 | Germany . |
| 4105074 | 11/1991 | Germany . |
| 4122273 | 1/1992 | Germany . |
| 4223723 | 1/1994 | Germany . |
| 4235863 | 1/1994 | Germany . |
| 466957 | 2/1969 | Switzerland . |
| 2118884 | 10/1985 | United Kingdom . |
| WO 86/07580 | 12/1986 | WIPO . |

Primary Examiner—James F. Coan
Assistant Examiner—Gene L. Kim
Attorney, Agent, or Firm—Evenson, McKeown, Edwards & Lenahan, P.L.L.C.

[57] ABSTRACT

A method for the manufacture of filters in which a filter material in the form of a continuous web is pre-embossed, perforated with a laser beam, and then pleated. The pleated filter element is fixed in a subsequent operation in an apparatus and the perforated scrap areas and are removed from the filter element.

20 Claims, 2 Drawing Sheets

U.S. PATENT DOCUMENTS

| | | | |
|---|---|---|---|
| 4,410,785 | 10/1983 | Lilly, Jr. et al. | 219/121.7 |
| 4,439,663 | 3/1984 | Lilly, Jr. et al. | 219/121.7 |
| 4,568,815 | 2/1986 | Kimbara et al. | 219/121.7 |
| 4,594,162 | 6/1986 | Berger | 156/474 |
| 4,672,168 | 6/1987 | Saunders et al. | 219/121.7 |
| 4,767,909 | 8/1988 | Okamoto | 219/121.71 |
| 4,798,575 | 1/1989 | Siversson | 493/347 |
| 4,940,500 | 7/1990 | Tadokoro et al. | 493/941 |
| 4,976,677 | 12/1990 | Siversson | 493/941 |
| 5,178,760 | 1/1993 | Solberg, Jr. | 493/343 |
| 5,225,649 | 7/1993 | Andreoli et al. . | |
| 5,273,560 | 12/1993 | Kaddya et al. | 493/941 |
| 5,382,773 | 1/1995 | Kurihara et al. | 219/121.7 |
| 5,389,175 | 2/1995 | Wenz | 493/347 |
| 5,444,210 | 8/1995 | Bingener et al. . | |
| 5,550,346 | 8/1996 | Andriash et al. | 219/121.71 |

METHOD OF MANUFACTURING FILTERS

This application is a continuation of application Ser. No. 08/539,412 now abandoned filed on Oct. 5, 1995.

BACKGROUND OF THE INVENTION

This invention relates to a method for manufacturing filters in which a filter material in the form of a continuous web is folded in a zig-zag manner in order to produce pleats in a resulting pleated filter element.

Published European Patent Application No. EP 260,267 B1 discloses a method in which filter material in the form of a continuous web is folded zig-zag to form pleats as a filter element. These pleats are fed on a transport medium, e.g., a conveyor belt, to a transport screw where the precise pleat spacing is set, and then the filter is sealed at its lateral edges.

A disadvantage of this known method is to be seen in the fact that the filter element can only take simple geometrical shapes. Especially in the production of air filters for passenger compartment ventilation in motor vehicles, it is necessary, as a result of the constricted space available, to create complex geometrical shapes for optimum adaptation to the surrounding area.

It is already known to create geometrical shapes in which, for example, a corner is clipped. This alone, however, does not suffice to produce complex geometrical shapes needed to make optimum use of the limited space available for the housing surrounding the filter.

SUMMARY OF THE INVENTION

It is therefore the object of the invention to provide a method for the manufacture of filters in which any geometrical shape can be achieved in a simple manner This and other objects of the invention have been achieved in accordance with the present invention by providing a method for the manufacture of a filter, comprising the steps of embossing a continuous flat web of filter material to facilitate subsequent pleating; perforating the embossed filter material web to define the shape and size of the filter ultimately to be produced; and thereafter folding the filter material in a zig-zag manner in a transfer station to form pleats.

An important advantage of the invention lies in the fact that the shape of the filter is formed in a perforating operation before the filter material is pleated. This perforating operation is performed on a planar paper web and can therefore be carried out without great expense. After perforation, the filter material is folded in pleats and automatically introduced into a comb system. Each comb is an individual workpiece holder and after the cutting of the filter paper can be treated as such.

Then the perforated filter paper is pushed off, whereby the paper bellows acquires its shape.

In one advantageous embodiment of the invention the perforation can be performed by a laser beam. The use of a laser beam for the perforation of paper is disclosed, for example, in United Kingdom Patent Application No. GB 2,118,884. Of course, it is possible by means of a laser beam to cut not only paper but also non-woven materials and other filter materials.

Using the method of the invention it is also readily possible to achieve round shapes in flat plate filters. This has been possible heretofore only through a very cumbersome process using complex punching tools.

The pleated filter element is transported, for example, by rotating spindles, or also by link belts which define the pleat spacing by their link pitch.

In accordance with one especially advantageous embodiment of the invention, a comb-like transport system can be used for the further processing of the filter element. In this embodiment the filter element is provided with a sealing frame, or other means, such as reinforcing angle braces or the like.

The positioning of the laser beam on the filter material to be perforated is carried out, for example, by an optical steering unit or a system running transversely over the filter material, which carries the laser device.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail with reference to the accompanying drawings in which.

DETAILED DESCRIPTION OF PREFERRED EMBODIMENTS

Figure 1:
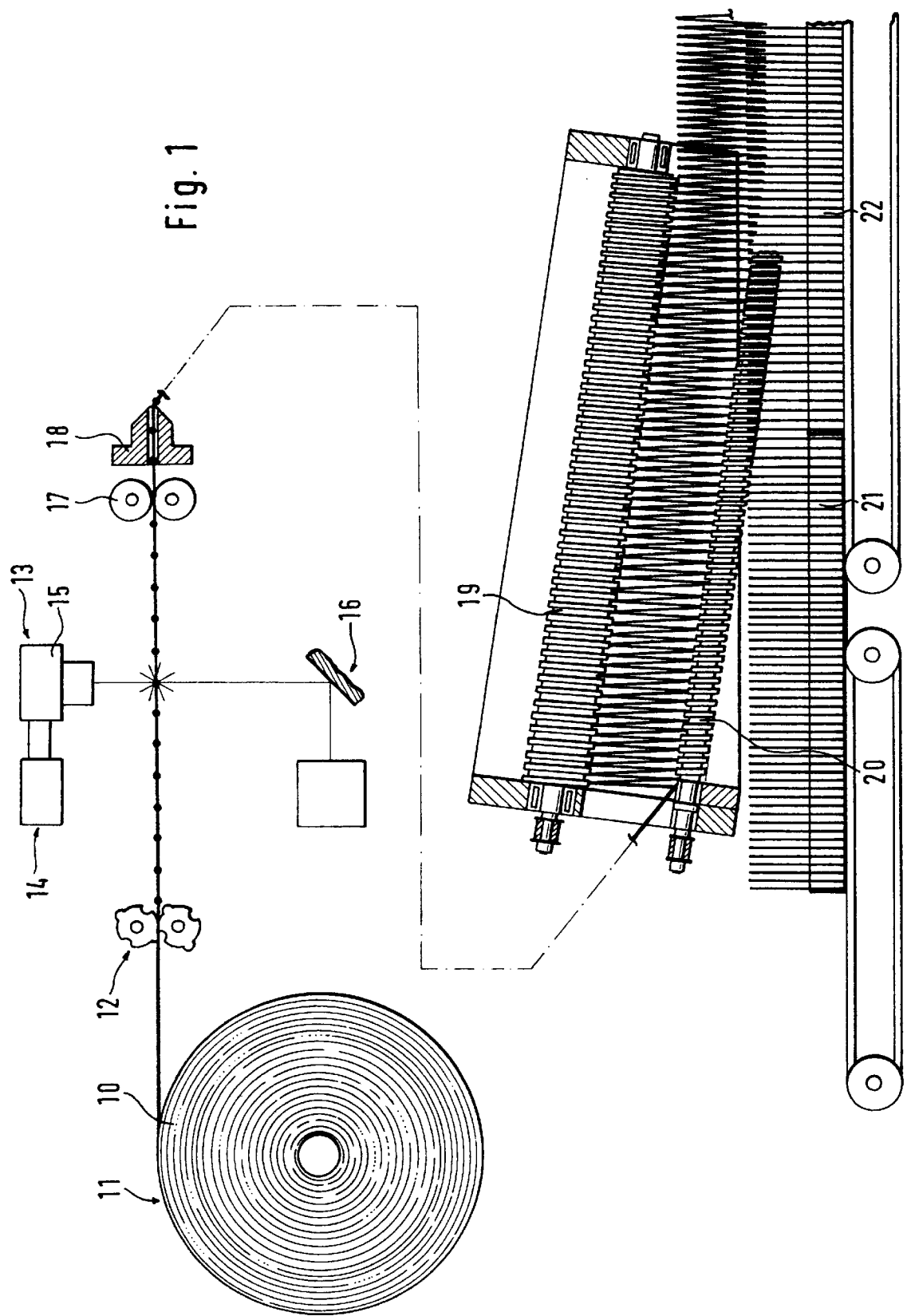
FIG. 1 shows a side elevation of an apparatus for manufacturing of filters.

Filter material 10 is fed from a roll 11 to the apparatus of FIG. 1. This continuous web filter material arrives at an embossing station 12 in which the filter web is pre-embossed for easier pleating. Then the filter material arrives at a perforating apparatus 13, consisting of an apparatus 14 for generating a laser beam, as well as deflecting units 15 and 16. The perforated filter material is fed over feed rolls 17 to a setting-up unit 18 which in conjunction with the feed rolls 17 performs a vertical movement and introduces the filter material into two or more feed spindles 19 and 20. Comb-like feeding systems 21 and 22 are disposed beneath the feed spindles. These receive the pleated filter material and transport it for further processing to a severing system not shown in FIG. 1.

Figure 2:
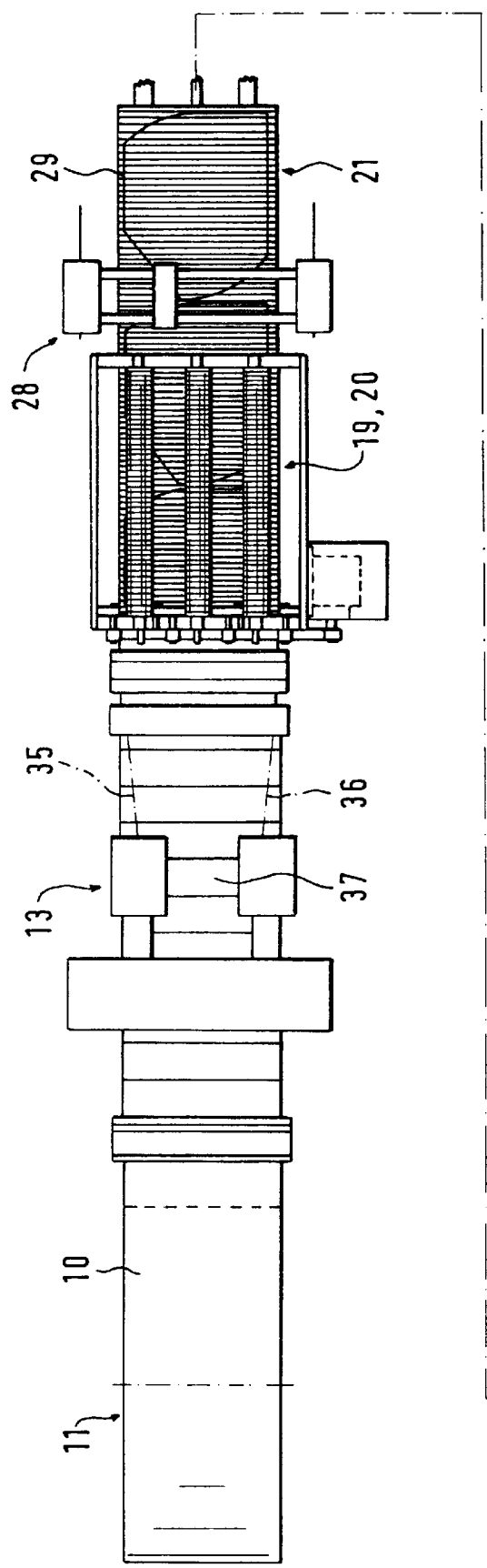
FIG. 2 shows a top plan view of the apparatus of FIG. 1.
Figure 2:
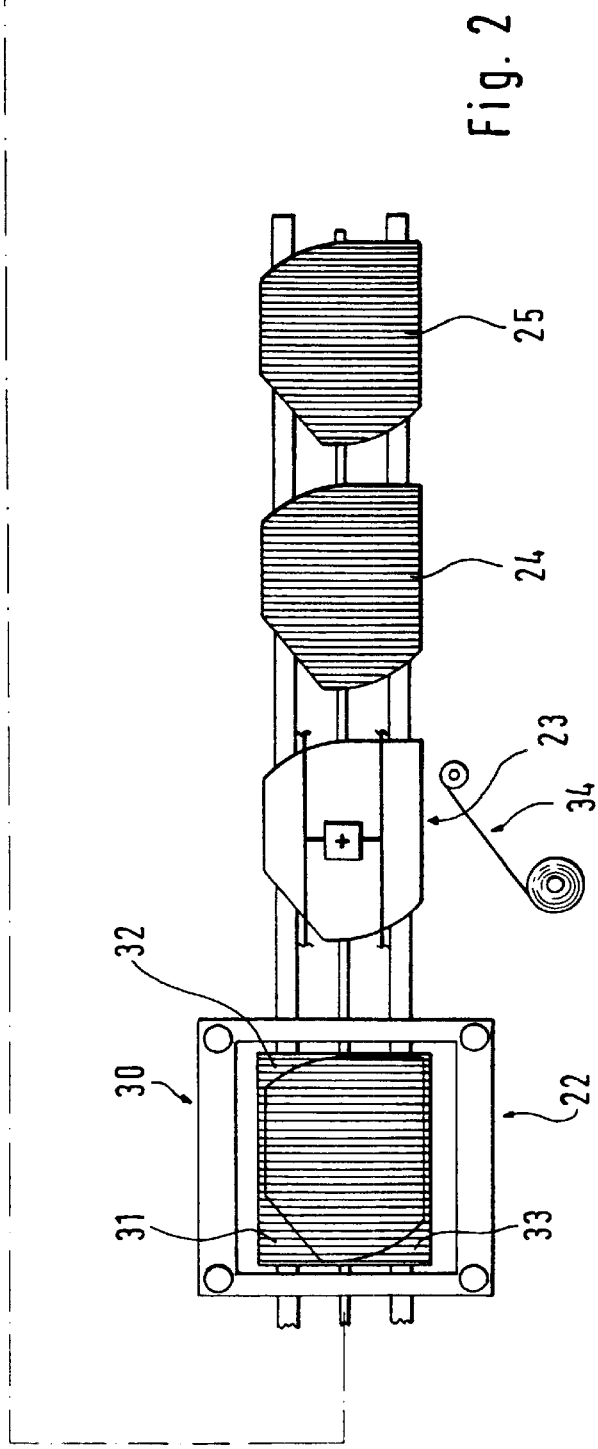

In FIG. 2, a top plan view of the apparatus for the production of filters is shown. The filter material 10 passing from the feed roll 11 moves through the perforating apparatus 13. The pre-embossed filter material is perforated along the lines 35 and 36 by laser apparatus 13. The laser beam is deflected across the web of filter material by deflecting apparatus 15 which is mounted on a beam 37 extending across the filter material. Alternatively, the laser apparatus may be movable along the beam 37 in order to move the laser beam across the web of filter material. The perforated filter material then enters between the feed spindles 19 and 20 as shown in FIG. 1. Here the filter element is transferred to the comb-like transport system members 21, 22, 23, 24 and 25 disposed beneath the filter material.

In a first severing apparatus 28 a severing cut is made across the web of filter material. The individual filter element 29 passes on to a subsequent severing apparatus 30. In this severing apparatus 30 the remaining areas 31, 32 and 33, which are defined by the perforations formed in the perforating step but are still attached to the external contour of the filter element, are removed. The filter element thus receives its desired non-rectangular shape.

In a following step the filter element is rimmed with a sealing tape 34. This sealing tape 34 is, for example, coated with a thermally activated adhesive material and provides for a lateral sealing of the pleated structure.

The finished filter element can then be removed from the apparatus.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for the manufacture of a filter, comprising the steps of:

embossing a continuous flat web of filter material to facilitate subsequent pleating;

perforating the embossed filter material web by means of a laser beam to define the shape and size of the filter ultimately to be produced;

folding the filter material in a zig-zag manner in a transfer station to form pleats;

severing the folded filter material from the web of filter material with a severing cut made across the web by a first severing apparatus to form an individual filter element having excess portions;

removing said excess portions from the individual filter element formed in said severing step in a subsequent severing apparatus; and applying a sealing frame around a rim of said individual filter element.

2. A method according to claim 1, wherein perforations formed in said perforating step define a non-rectangular shaped filter.

3. A method according to claim 1, wherein the zig-zag folded filter element is transported via rotating spindles.

4. A method according to claim 3, wherein the filter element transported by the spindles is transferred to a transport system.

5. A method according to claim 4, wherein said transport system comprises comb-like transport members in which said pleats are received.

6. A method according to claim 1, wherein said laser beam is generated by a laser apparatus movable along a beam extended across the web of filter material.

7. A method according to claim 1, wherein during the perforating step, the laser beam is guided across the filter material by means of a deflecting unit.

8. A method according to claim 7, wherein the deflecting unit is disposed on a beam extending transversely across the web of filter material.

9. A method according to claim 1, wherein said sealing frame is a sealing tape coated with a thermally activated adhesive.

10. A method according to claim 1, wherein said sealing frame is applied directly to said filter material on all lateral sides of said filter element to form a self-supporting structure.

11. A method according to claim 1, wherein said sealing frame is applied to said rim of said filter element such that said pleats are sealed.

12. A method according to claim 10, wherein said sealing frame is applied to said rim of said filter element such that said pleats are sealed.

13. A method according to claim 1, wherein in said folding step the filter material is folded in the zig-zag manner via a setting-up unit directly followed by at least two threaded feed spindles arranged on opposite sides of the web, said setting-up unit moving vertically to introduce the pleats into threads of the feed spindles, said feed spindles being synchronously rotatable to transport said folded filter material.

14. A method according to claim 13, wherein following said folding step said folded filter material is transported via a comb-like transport system arranged following said feed spindles to maintain said pleats in a folded position.

15. A method according to claim 14, wherein said comb-like transport system transports said folded filter material throughout said severing, removing, and applying steps.

16. A method for the manufacture of a filter, comprising the steps of:

embossing a continuous flat web of filter material to facilitate subsequent pleating;

perforating the embossed filter material web by moving a laser beam in a direction transverse to a longitudinal direction of said web to define the shape and size of a non-rectangular filter to be produced;

folding the filter material in a zig-zag manner in a transfer station to form pleats;

severing the folded filter material from the web of material with a severing cut made across the web by a first severing apparatus to form an individual filter element having excess portions;

removing said excess portions from the individual filter element formed in said severing step in a subsequent severing apparatus; and applying a sealing frame around a rim of said individual filter element.

17. A method according to claim 16, wherein said perforating step is performed while said web is continuously moving.

18. A method according to claim 17, wherein said sealing frame is applied directly to said filter material on all lateral sides of said filter element to form a self-supporting structure.

19. A method according to claim 17, wherein said sealing frame is applied to said rim of said filter element such that said pleats are sealed.

20. A method according to claim 18, wherein said sealing frame is applied to said rim of said filter element such that said pleats are sealed.

* * * * *